(12) United States Patent
Kulkarni et al.

(10) Patent No.: US 9,137,184 B2
(45) Date of Patent: *Sep. 15, 2015

(54) SYSTEM AND METHOD FOR AUTOMATED CHAT TESTING

(71) Applicant: Cyara Solutions Pty Ltd, Melbourne, Victoria (AU)

(72) Inventors: Alok Kulkarni, Glen Iris (AU); Geoff Willshire, Greenslopes (AU)

(73) Assignee: Cyara Solutions Pty Ltd, Melbourne (AU)

(*) Notice: Subject to any disclaimer, the term of this patent is extended or adjusted under 35 U.S.C. 154(b) by 0 days.

This patent is subject to a terminal disclaimer.

(21) Appl. No.: 14/141,424

(22) Filed: Dec. 27, 2013

(65) Prior Publication Data
US 2014/0108583 A1    Apr. 17, 2014

Related U.S. Application Data

(63) Continuation of application No. 13/936,186, filed on Jul. 6, 2013, and a continuation-in-part of application No. 14/140,449, filed on Dec. 24, 2013, which is a continuation of application No. 13/936,147, filed on Jul. 6, 2013, application No. 14/141,424, which is a continuation-in-part of application No. 12/644,343, filed on Dec. 22, 2009, now Pat. No. 8,625,772, and a continuation-in-part of application No. 13/567,089, filed on Aug. 6, 2012.

(51) Int. Cl.
*H04L 12/58* (2006.01)
*H04M 3/51* (2006.01)
*H04L 12/24* (2006.01)

(52) U.S. Cl.
CPC ............ *H04L 51/046* (2013.01); *H04M 3/5175* (2013.01); *H04L 41/00* (2013.01); *H04L 41/14* (2013.01); *H04L 51/02* (2013.01)

(58) Field of Classification Search
CPC ..... H04L 43/00; H04L 41/14; H04L 12/2456; H04L 12/26
USPC ......................................................... 709/206
See application file for complete search history.

(56) References Cited

U.S. PATENT DOCUMENTS

| | | | |
|---|---|---|---|
| 2004/0008825 A1* | 1/2004 | Seeley et al. | 379/32.01 |
| 2006/0167970 A1* | 7/2006 | Seeley et al. | 709/202 |
| 2011/0075568 A1* | 3/2011 | Omar | 370/242 |
| 2012/0226487 A1 | 9/2012 | Birch et al. | |
| 2014/0114895 A1* | 4/2014 | Beechum et al. | 706/46 |

FOREIGN PATENT DOCUMENTS

WO    2008086442 A3    9/2008

* cited by examiner

*Primary Examiner* — Tom Y Chang
(74) *Attorney, Agent, or Firm* — Galvin Patent Law LLC; Brian R. Galvin

(57) ABSTRACT

A system for flexible and scalable automated end-to-end chat-based contact center testing, having a test case management platform, a chat cruncher, a contact center manager, a chat classifier, a desktop automation engine, and headless browser-based virtual agents and customers. The test case management platform allows a user to configure operation of the system. The chat cruncher operates a plurality of virtual customers. The contact center manager operates a plurality of virtual agents to participate in chat session with virtual customers.

2 Claims, 9 Drawing Sheets

SYSTEM AND METHOD FOR AUTOMATED CHAT TESTING

CROSS-REFERENCE TO RELATED APPLICATIONS

This application is a continuation of U.S. patent application Ser. No. 13/936,186, titled "SYSTEM AND METHOD FOR AUTOMATED CHAT TESTING", which was filed on Jul. 6, 2013, and is a continuation-in-part of U.S. patent application Ser. No. 14/140,449, titled "SYSTEM AND METHOD FOR AUTOMATED CHAT TESTING", which was filed on Dec. 24, 2013, which is a continuation of Ser. No. 13/936,147, titled "SYSTEM AND METHOD FOR AUTOMATED CHAT TESTING", which was filed on Jul. 6, 2013, and is a continuation-in-part of U.S. patent application Ser. No. 12/644,343, titled "INTEGRATED TESTING PLATFORM FOR CONTACT CENTRES", which was filed on Dec. 22, 2009, and is a continuation-in-part of U.S. patent application Ser. No. 13/567,089, titled "SYSTEM AND METHOD FOR AUTOMATED ADAPTATION AND IMPROVEMENT OF SPEAKER AUTHENTICATION IN A VOICE BIOMETRIC SYSTEM ENVIRONMENT" which was filed on Aug. 6, 2012, the specifications of each of which are hereby incorporated by reference in their entirety.

BACKGROUND OF THE INVENTION

1. Field of the Invention

The invention relates to the field of contact center operations, and more particularly to the field of end-to-end testing of chat-based client interaction software systems.

2. Discussion of the State of the Art

In the field of contact center operations, traditionally communication between agents and customers is performed via voice-based systems such as traditional telephony or voice over Internet protocol (VoIP) systems. However, more centers are beginning to accommodate additional, text-based communications such as Internet-based chat software commonly found in the art, to better serve customers who may not have access to or desire to utilize a voice connection. A common example of this would be a customer browsing through an online catalog on a company's website. In such a scenario, a customer might have a question about a product, and both customer and company may benefit from the inclusion of a convenient chat interface within a webpage, allowing customers to communicate directly with agents while still browsing the online catalog and from the convenience of their computer. This allows more convenient and speedy communications, without the need to navigate a telephony-based interactive voice interactive voice recognition (IVR) system to reach an agent or waiting in long queues for an agent to become available. It also allows more flexible communications, such as a customer who may be viewing an online catalog from an Internet café or similar public location, where they may not have access to a telephone or may not desire for their conversations to be overheard by others.

In accordance with this shift in contact center methodology, it will be appreciated that there exists a need to test and evaluate chat-based systems to ensure reliable contact center operation and resolve issues that might impact customer interactions, such as frozen chat sessions or delay in text transmission. It will be appreciated that such testing systems should also accommodate a variety of endpoints, such as chat interfaces embedded in webpages, dedicated chat software to be run on a personal computer or mobile chat applications, without affecting the reliability of test results and without requiring human interaction or modification.

There exist in the art testing methods for voice communications, but it will be appreciated that such methods may not translate well to text-based systems. Furthermore, while there are chat testing systems implemented in the art currently, such systems require the interaction of a testing agent to operate, which introduces new problems such as additional expense for the time and labor involved in testing, human error factor which may influence reliability of testing protocols, and various inconsistencies associated with human operation.

What is needed is a flexible and scalable automated testing solution for chat-based communications, which may operate in parallel with a production environment without impacting ongoing customer interactions and which may accommodate a variety of endpoints and infrastructure implementations without negatively impacting testing reliability. In addition, what is needed is a means to facilitate end-to-end testing of chat-based communications, that allows testing of chat frontend software in a manner that accurately represents actual usage and does not interfere with actual client interactions.

SUMMARY OF THE INVENTION

Accordingly, the inventor has conceived and reduced to practice, in a preferred embodiment of the invention, a method for automated chat testing which does not rely on specific chat software or endpoints and which is scalable to accommodate various implementation architectures, and a preferred system for implementation of such a method.

According to a preferred embodiment of the invention, a system for handling automated chat testing for contact centers, comprising a test case management (TCM) platform, "chat cruncher", contact center manager (CCM), chat classifier, and desktop automation engine (DAE), is disclosed. According to the embodiment, a TCM platform may present a web-based, graphical user interface for creating and managing test cases and viewing results reports, as illustrated in detail in FIG. 6 and FIG. 7. Such functionality may allow users to input additional test protocols, view results of prior tests, view tests as they are being run for realtime analysis, and manipulate test result reports (such as, for example, selecting specific reports and exporting them to a database or other storage medium for backup purposes). A "chat cruncher", according to the embodiment, may handle the loading and execution of test cases, including (but not limited to) such functions as generating simulated customer traffic and testing various chat endpoints for customer experience (such as, for example, embedded chat interfaces in webpages) and handling the automation of load testing by varying the amount of traffic generated. A CCM system may simulate agent activity and perform contact center functions with regard to simulated customer traffic from a chat cruncher, and may replicate actual agent activities by directly manipulating a chat server utilized by a contact center, thereby also incorporating testing of existing center architecture such as chat server, CTI server, or other internal components. It will be appreciated that such implementation does not rely on any particular existing components or arrangements, thus facilitating scalability to a variety of contact center infrastructures. A chat classifier may be implemented according to the embodiment, to classify chat interactions according to their nature as either simulated interactions being run by the testing system, or actual customer-agent interactions. In this manner, a chat classifier may be used to enforce boundaries between the testing environment and production environment within a contact center, allowing tests to be run simultaneously without impacting center performance and customer experience. A DAE system may be used according to the embodiment, to directly manipulate an agent desktop environment rather than directly interacting with a chat server, adding the functionality of testing the agent experience. Accordingly, a single exemplary test case might perform testing of internal contact center systems such as CTI server or chat server as described above, agent desktop software, inbound traffic management and load handling, as well as customer experience via a variety of chat interaction endpoints and overall routing efficiency of all performed requests, and then store test case results data for viewing and analysis. It will be appreciated by one having skill in the art that the described preferred arrangement is exemplary and alternate arrangements may be possible according to the invention, and that as the art continues to evolve new functionality and appropriate testing protocols may be implemented within the scope of the invention.

According to another preferred embodiment of the invention, a method for automated chat testing is disclosed. According to the embodiment, in an initial step a test case is started. This may be performed as an automated task, such as a scheduled event or part of a routine that is run periodically or when certain conditions are met. It could also optionally be triggered by human interaction via a TCM platform, for the creation and execution of custom test cases as might be desirable to test specific features or processes, or to perform a "trial run" of a new test case before it is set to run automatically. Upon execution of a test case, a plurality of virtual customers and agents are created, which are used as endpoints for the chat testing. This approach implicitly tests each system involved in the chat process as the test runs. Results of the virtual customer and agent creation may be stored in a testing database or similar datastore, which may be located either locally as a part of a contact center infrastructure, or may be any of a variety of remote storage media such as cloud-hosted storage located remotely from the contact center and accessed via the internet or other data network. Stored data may then be used later for generation of detailed reports for viewing test data, which may in turn also be stored for later retrieval. Next, according to the specific test case being performed, one or more virtual customers initiate chat sessions. Such a session initiation request may be sent via the Internet or other data network and handled similarly to an actual inbound request from a customer. In order to enforce boundaries within the contact center and prevent a test case from impacting operations, a chat classifier may be implemented to analyze chat requests passing through the center and "flag" them as test case-related as appropriate. In this manner, test data may follow a similar path to actual customer interactions without interfering with contact center operations such as sending a virtual customer's request to a real agent or exposing testing data to customers. It will be appreciated by one skilled in the art that this step may be optional, as it is not always necessary to run testing in parallel with normal center operations—for example, testing could be run outside of a center's operating hours, when inbound traffic is handled by an automated system informing customers of the hours of operation and no traffic gets through to the center. Again, resultant data from this step may be logged in a data store for use in reporting. After a session is initiated and optionally classified, a virtual agent responds and the chat session proper may begin according to the test case being run (the method described herein does not assume a particular script, it will be appreciated that such test cases may vary widely). Customer and agent exchange chat messages according to the test, results being logged accordingly, and optionally a CCM platform may interact with an agent desktop to facilitate testing of the agent experience and test the operation of contact center software. Such an agent desktop may be a physical computer workstation running the agent desktop environment software, or it might be a virtual desktop being run inside of the testing system without a physical computer presence. Results from agent desktop interaction (if any) are logged, and finally all logged data is collated into a results report upon completion of a test case. Resultant reports may be stored for later retrieval, and may be made viewable from within a TCM platform for analysis by a user. In this manner, results from previous tests are available so that a user may optimize any future tests from the TCM platform's graphical interface.

According to another embodiment of the invention, chat-based software frontends may be examined for stress-testing, functionality, reliability, response time, or other useful testing metrics, such that a particular frontend application may be tested prior to implementation in actual contact center operations. According to the embodiment, a testing method may enable the use of various third-party or external frontend software, such that a single testing system may be utilized with any frontend software as needed. In this manner, new or alternate frontends may be examined for viability in real or simulated conditions to verify their function prior to deployment. According to the embodiment, features inherent to Internet-based or similar Internet Protocol (IP) networks may be utilized to facilitate system operation, such as the use of HTTP headers (that are a key feature of data packets sent over such a communication network) to identify chat behavior or parameters, or the use of specially-crafted URLs to identify chat servers for use in testing (i.e., rather than connect to a phone number, a chat frontend may request a specific URL to interact with a testing server). By utilizing headers in this manner, a determination may be made as to handling of an interaction based on the information in the headers received (such as how to route a chat request), without special accommodations being added to a frontend itself. Such function may be utilized to enable testing on various networks by utilizing basic technological features inherent to all IP-based communications, rather than requiring a specific testing network to be utilized for proper function. In this manner, testing may utilize external connections such as remotely-located contact center agents or software elements operating as agents or customers, and may utilize the same networks (i.e., the Internet) that a customer might utilize in their interactions with a contact center (as opposed to conducting testing on an internal network within a contact center). It will be appreciated that by using such an approach, testing may utilize the same technological elements as actual customers, thereby closely duplicating actual operating conditions of a contact center chat interaction.

As an extension to utilizing existing communication technology to facilitate operation, a testing system may operate across external connections such as remote chat frontends interacting via the Internet or similar data communication network. In this manner, a testing system may utilize actual network connections, physical hardware, or locations that an actual customer might utilize, increasing relevancy of test results. Furthermore, such functionality enables the use of distributed contact center agents operating via cloud-based or remote frontends, as is a common arrangement in cloud-based or distributed contact center operations in the art, and that may interact with a central testing system without the need for any special configuration or hardware. In this manner, remote agents may utilize their existing hardware or familiar chat frontends while utilizing the full functionality of an end-to-end testing system. In addition, distributed agents may participate in automated testing such as scheduled chat test interactions, such as may be useful for load-testing to ensure a particular connection or frontend is robust enough to handle interaction traffic levels of actual operation. A further use may be periodic or random testing of agents and their frontends, that may be initiated from a testing system simulating a customer interaction such as to perform periodic tests and ensure consistent operation of a contact center as well as to (as appropriate) ensure continued operation if changes are made within a center or a testing system (for example, if a configuration is altered, a batch of tests may be initiated to ensure operation).

Further according to the embodiment, a chat interaction may utilize a plurality of communication technologies (such as physical connection, cable- or fiber-based internet connection, cellular communications networks, or other communications technologies), at any point along a connection or at any moment during an interaction. Such technologies may be utilized simultaneously, or in sequence, or according to a random or configurable pattern. In this manner, any communication technology that might be utilized during an interaction may be tested, ensuring a test may fully encompass any possible scenario of customer-agent interaction.

In addition to operating test cases on actual technology or networks as described above, such test cases should also examine and measure key metrics or test functions to accurately represent actual client-agent interactions. For example, a test case may measure time to connect to a chat server or to a second chat participant (such as a contact center agent), time spent waiting for an agent to "pick up" and join an interaction (i.e., a "hold time" metric as it pertains to chat-based interactions), waiting to receive text or waiting to send a response (such as for simulating a customer typing a question, or an agent looking up information to formulate a reply), selecting response strings to return to a customer (or simulated customer), or other functions that may be tested without reliance on any particular frontend. In addition, as customers or other participants may use varying frontend applications with varying processes or functions, an underlying software element inherent to a testing system should be able to handle requests from a frontend as well as process output to be send to a frontend, in a manner that will be compatible regardless of a particular software application being used. In this manner a testing solution may be scalable to a wide variety and quantity of frontend chat programs without compromising function.

In addition, a "campaign" functionality may be utilized by a testing system such as to select or configure testing procedures for operation, for example selecting what scripts to run, what strings to send, values for such variables as wait times, and other configurations that may be desirable to store for future reference or use. Additionally, when operating a test campaign, results may be reported or logged in relation to a particular campaign, such that when reviewing test results a campaign's configuration may be made available along with results of previous executions of that campaign. In this manner, testing may be configured not only for scheduling or periodicity ("when" tests run) but also for configuration parameters controlling particular test operation, such as variable wait times, networks to be tested, what agents to send test interactions to, bounds for test errors or other operating parameters, or how to report test results ("how" tests are run). In this manner a variety of tests and test types may be configured, and configurations may be altered or maintained by editing a stored campaign rather than configuring individual tests manually. Furthermore, campaigns may be linked such as to provide a hierarchical testing approach—for example, if "test campaign A" returns results within certain bounds, run "test campaign B", but if "A" returns outside of those bounds, run "test campaign C". In this manner a fully autonomous testing regimen may be configured that may be adaptable to its own operation, and human intervention may only be needed to change campaign configuration while regular operation may be configured to proceed unsupervised. It should be appreciated that such an approach may also leave open the possibility of interactive reporting, such as campaigns that compile and send results to appropriate parties (for example, alerting IT staff if a hardware failure is detected), and that such reports may be linked to the campaign or even a particular test being performed to increase the relevancy and usefulness of reported content. It will be further appreciated that by combining such reporting behavior with previously-described testing methods (such as utilizing HTTP headers or other embedded data in communications), reports may show not only system operation but also a "client's eye" view of an interaction—i.e., what a customer saw or experienced during an interaction, such as slow response times form an agent. In this manner testing may be even more relevant and may isolate issues that may not appear in traditional testing operations—continuing the above example, a customer may have experienced slow response times while a testing system showed fast response from a real or simulated agent during an interaction. This might be used to isolate (for example) a problem with connectivity or hardware during the communication path between customer and agent, facilitating more precise system diagnostics and overall efficiency of operation.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
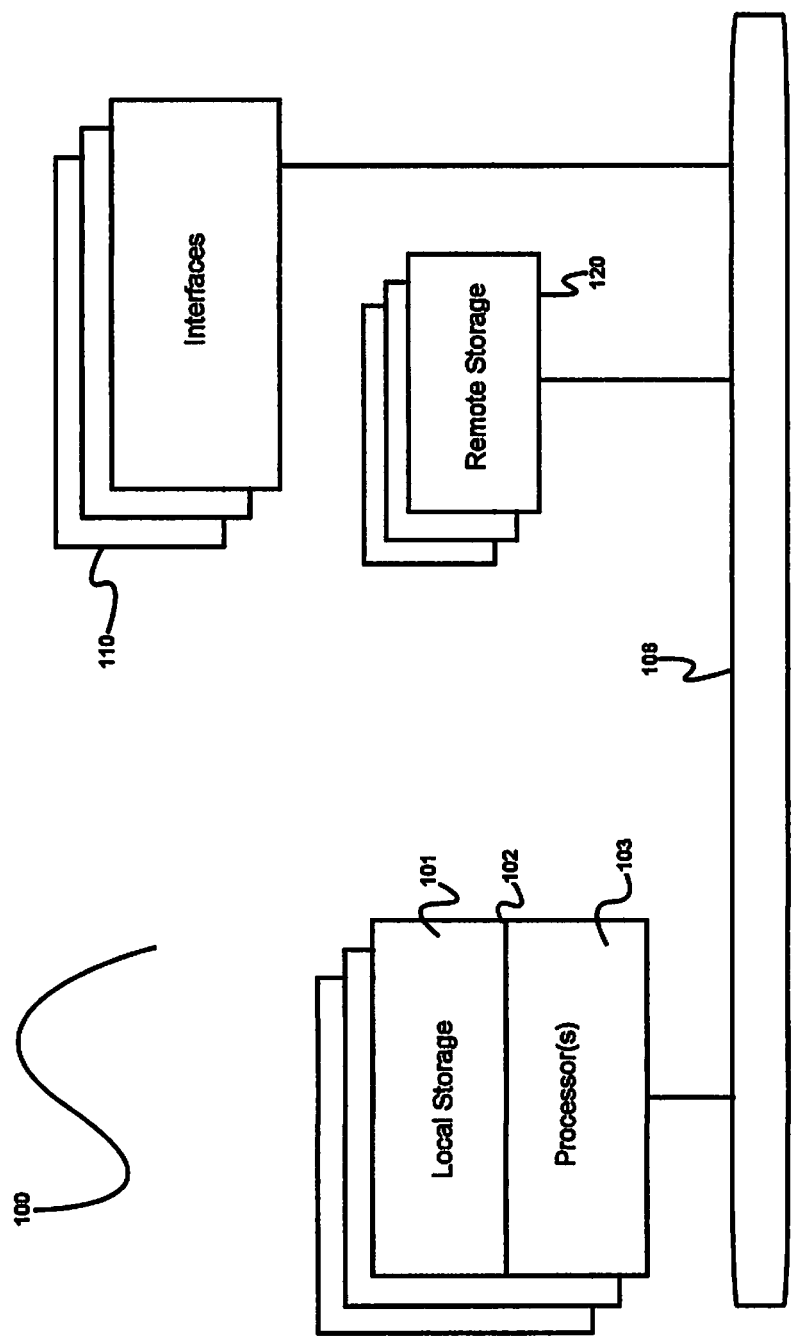
FIG. 1 is a block diagram illustrating an exemplary hardware architecture of a computing device used in an embodiment of the invention.

The inventor has conceived, and reduced to practice, a system and method for automation of chat-based contact center interaction testing, comprising a flexible and scalable architecture and method to facilitate reliable automated testing and improve contact center operations.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

DEFINITIONS

A "chat cruncher", as used herein, is a software or hardware-based system that is designed to receive input of test case information and produce chat-based output for the execution of a test case. In this manner a chat cruncher may be used to simulate chat-based interactions by producing predetermined chat messages to initiate interactions or in response to received input during an interaction, replicating the effect of interacting with another individual user via a chat-based communication system.

A "chat classifier", as used herein, is a software or hardware-based system that is designed to receive a flow of chat-based interaction data and analyze it to determine whether it is part of a test case or an actual customer interaction. The chat classifier may then determine how chat data is to be routed, such as sending interaction chat data to contact center agents for handling while sending test case data to other testing systems. In this manner, a chat classifier may be responsible for boundary enforcement, preventing any test data from overlapping or interfering with actual contact center operations.

A "desktop automation engine", abbreviated DAE, as used herein, is a software-based system design to emulate contact center agent interaction with agent desktop software elements for testing of such elements, which may be run normally as in an agent's desktop environment during contact center operations. In this manner, a desktop automation engine may be configured on an existing agent desktop to interact with standard elements of the desktop environment, rather than requiring a dedicated or specialized desktop to be configured specifically for testing purposes.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
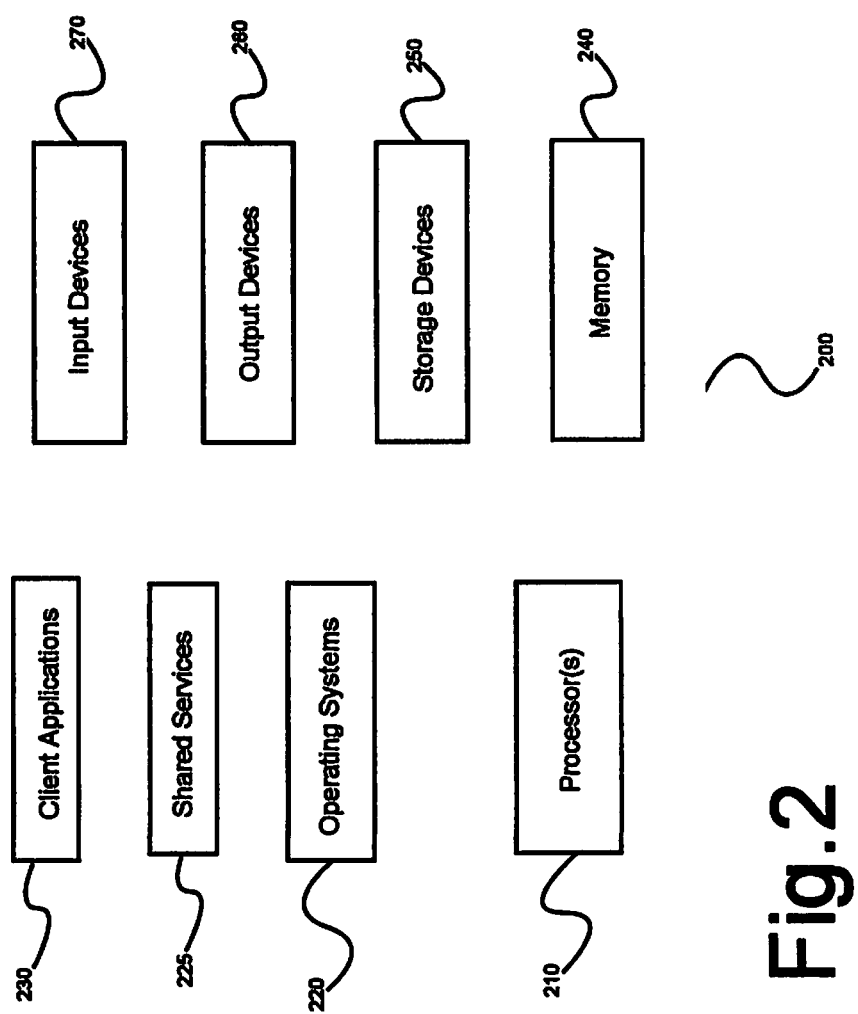
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
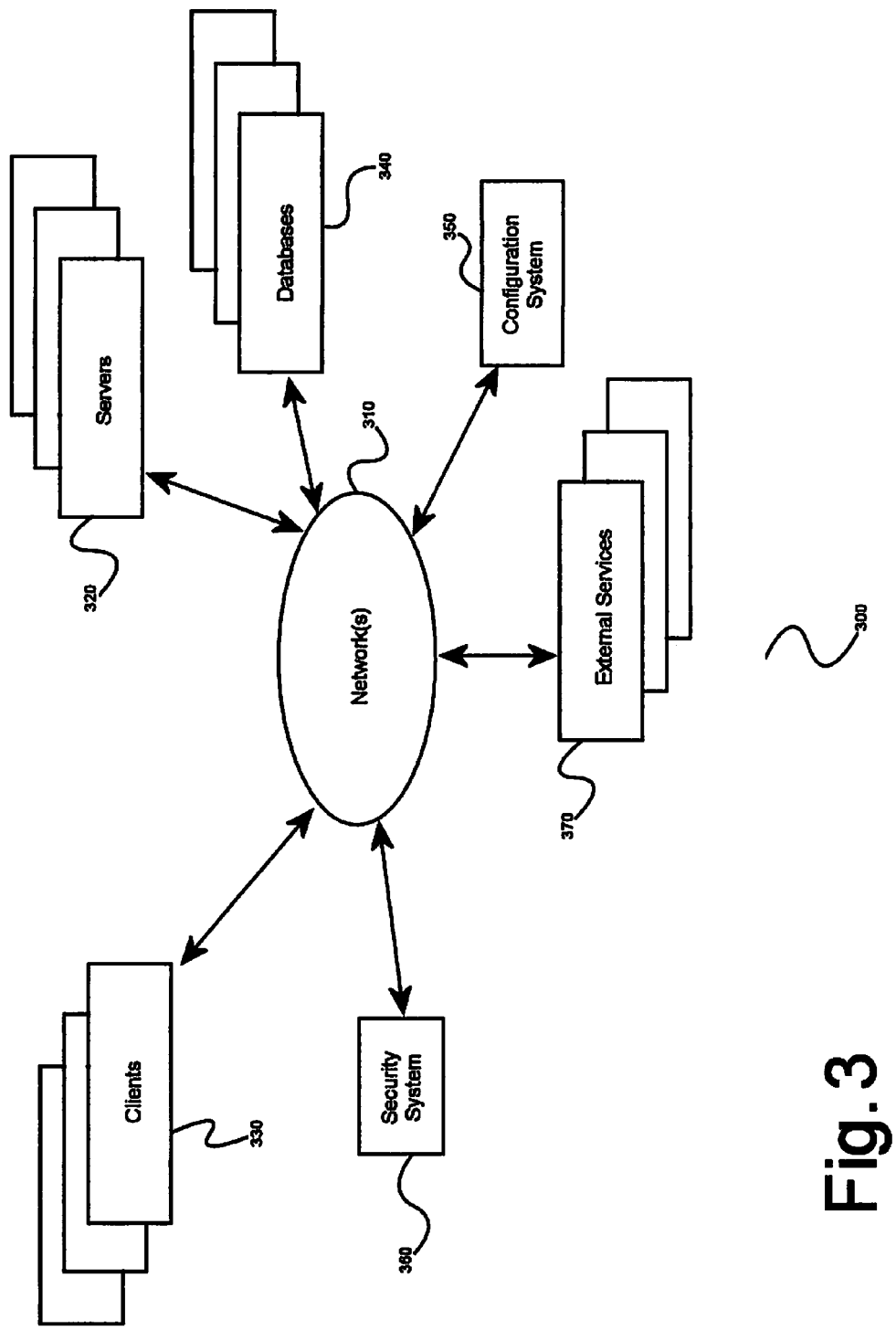
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 4:
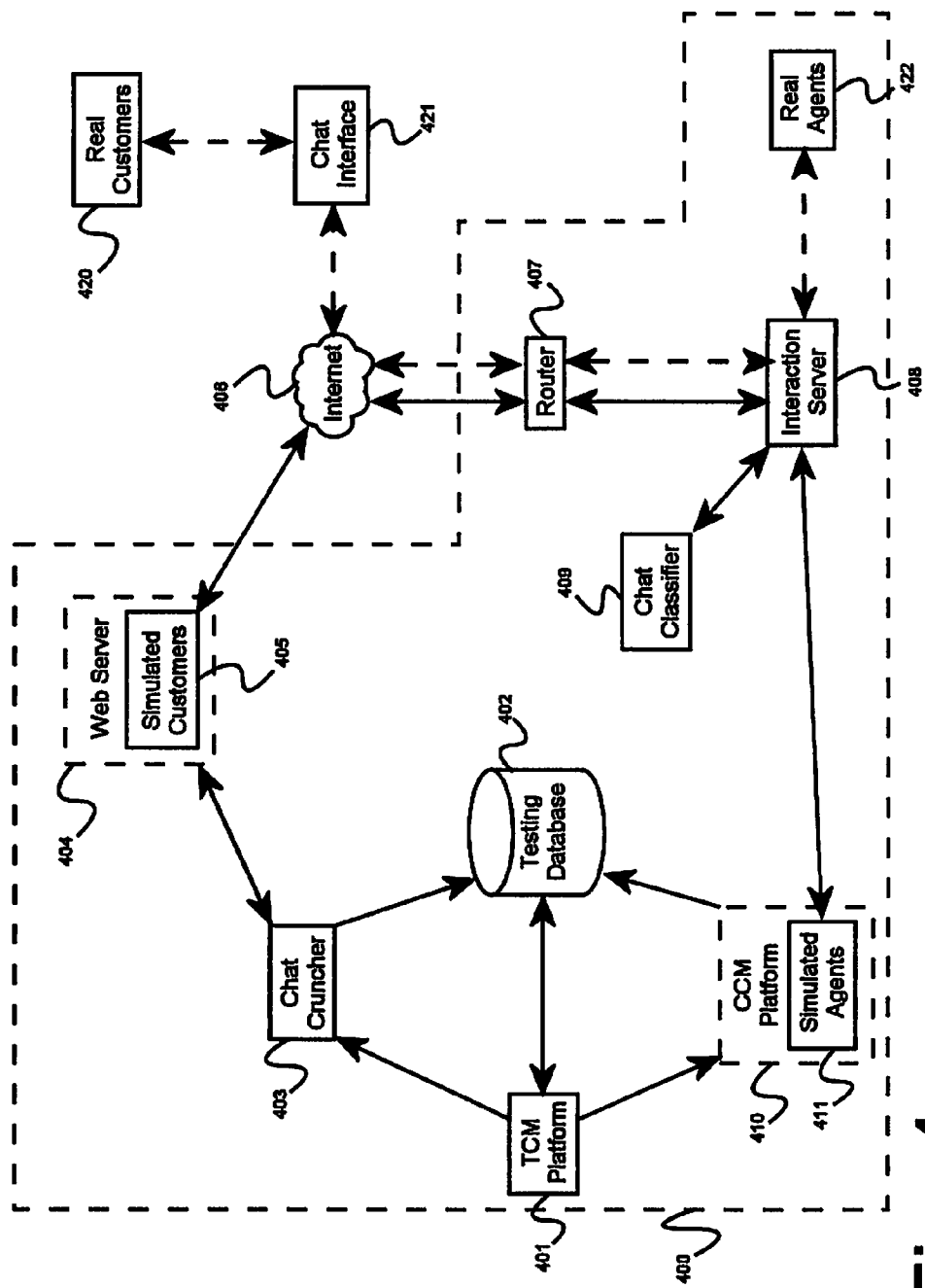
FIG. 4 is a block diagram illustrating an exemplary system architecture for automated chat testing integrated with traditional contact center components, according to a preferred embodiment of the invention.

FIG. 4 is a block diagram of a preferred embodiment of the invention, illustrating a system for automated chat testing incorporating common contact center elements and running in parallel to actual contact center operations. As illustrated, a contact center 400 may implement a TCM platform 401, which may serve as the beginning or origin of a test case. TCM platform 401 may operate automatically or optionally may accept human interaction via a graphical user interface for manipulation of test cases and viewing of test result reports which may be stored in a testing database 402. When a test is run, TCM platform 401 initiates a test case with chat cruncher 403 and CCM platform 410, which may each then begin their respective automated testing processes. Chat cruncher 403 may simulate a plurality of virtual customers 405 which operate via a web server 404 to send and receive data via an internet or other data communications network 406, while CCM platform 410 may similarly simulate virtual contact center agents 411 which may receive and respond to data requests. Data requests sent by simulated customers 405 via a data network 406 may be received and handled by a router 407, which may forward requests from customers to an interaction server 408 and requests from agents to customers via a data network 407. Interaction server 408 may verify data requests with a chat classifier 409, which may identify requests as part of a test case or actual contact center operations, to determine handling protocol. If a request is determined to be a part of a test case, interaction server 408 may then proceed with test case handling. If a request is inbound from router 407, it may be forwarded to CCM platform 410 for handling by virtual agents 411, or if it is an outbound request from a virtual agent 411 it may be sent to router 407 for transmission to a virtual customer 405 via a data network 406. Virtual agents 411 may operate by interacting directly with interaction server 408 or by automatically interacting with a real or simulated agent desktop environment according to the specific nature of a test case. During and/or after the execution of a test case, data may be stored in a database 402 by CCM platform 410 or chat cruncher 403, for the formulation of test reports to be stored for later viewing by a user via TCM platform 401. In this manner it will be appreciated that the flow of data requests within a test case is bidirectional, i.e. requests may continually and asynchronously be sent from simulated customers 405 to simulated agents 411 and vice-versa, without necessitating a strict pattern or rhythm of data flow. It will be appreciated that in such a manner it is possible to simulate a customer sending multiple chat requests while an agent waits to send a response, or for an agent to send multiple requests while a customer waits. Such occurrences are commonplace in practice, and in this manner a test case may more accurately simulate actual contact center operations for more relevant and reliable testing data.

As illustrated according to the embodiment, normal operations may continue uninterrupted within a contact center 400 while a test case is being performed. Customers 420 may continue to operate a chat interface 421 as normal without any impact on customer experience from a test case, sending chat requests to contact center agents 422 according to the flow illustrated. Chat requests may be sent from a chat interface 421 via a data network 406, requests may then be received and handled by a router 407 within a contact center. Router 407 may then send requests to an interaction server 408, which may then verify requests with a chat classifier 409 to determine their nature as legitimate customer interaction. Requests may then be sent to agents 421, and return requests follow an opposite path through interaction server 408, router 407, and then outward from contact center 400 via a data network 406 to a customer's chat interface 421. In this manner it will be appreciated that normal contact center operations may be running in parallel to test cases, without any impact on customer experience.

DETAILED DESCRIPTION OF EXEMPLARY EMBODIMENTS

Figure 5:
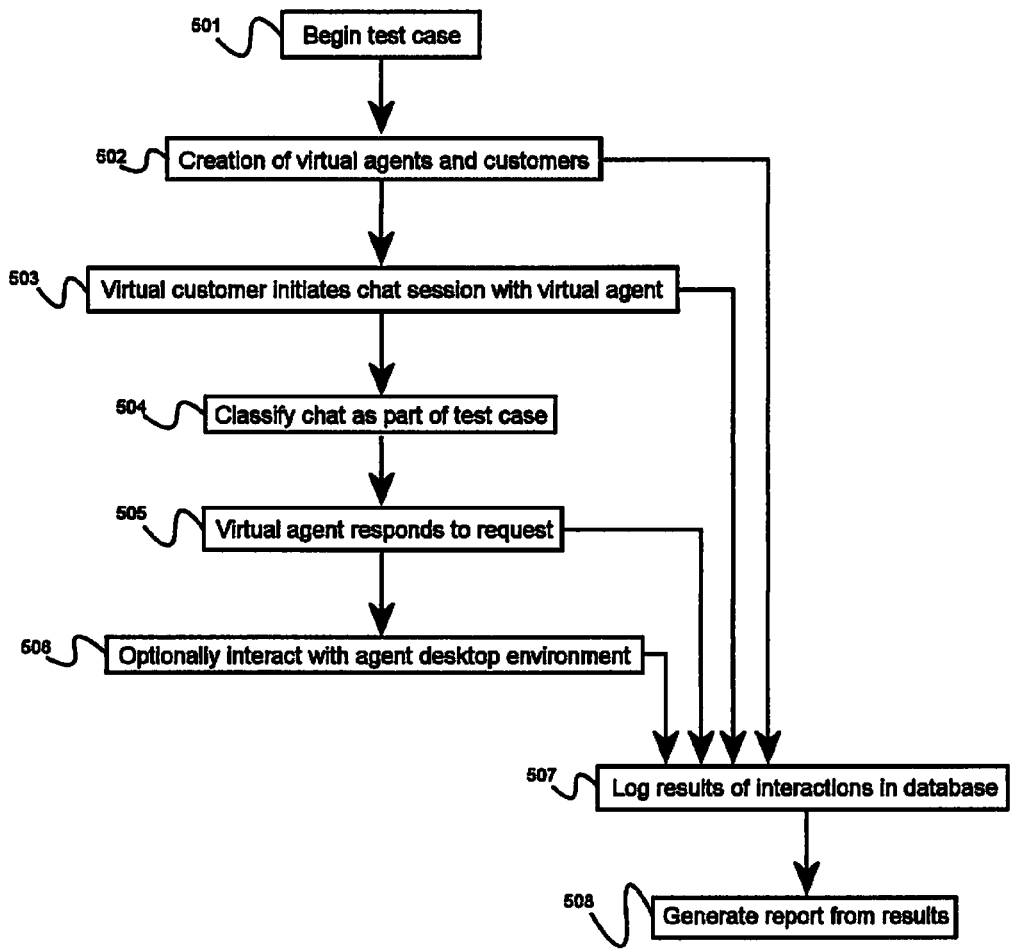
FIG. 5 is a block diagram illustrating a method for automated chat testing, according to a preferred embodiment of the invention.

FIG. 5 is a method illustration of a preferred embodiment of the invention, illustrating a general flow for handling automated chat testing within a contact center. In an initial step 501, a test case begins. Such a test case may be triggered automatically as a scheduled event or part of a routine, or it may be triggered manually via user interaction with a TCM platform 401 as described previously. In a second step 502, virtual agents and virtual customers are created within the testing system and the results of their creation may be logged into a testing database 402 or other storage medium during a logging step 507. A virtual customer then initiates a chat session in a step 503, and the results may again be logged in a logging step 507. A chat classifier then classifies this chat session as part of a test case in a step 503, to ensure boundary enforcement so that test data does not overlap or otherwise interfere with production environment data during contact center operation. Upon receipt of a test chat request, a virtual agent may then respond in a step 504, and the results of this response are logged in a logging step 505. According to the test case, a CCM platform 410 may interact with a real or virtual agent desktop to test agent experience and further evaluate contact center operation in a step 506, and the results of this interaction may be logged in a logging step 507. Finally, logged information from previous steps of a test case may be aggregated and formulated into a results report in a reporting step 508, which may be further stored in a database 402 or similar storage medium for later retrieval. It will be appreciated that such a method flow is exemplary, and that while the illustrated flow is thought to be an ideal solution by the inventor, alternate implementations are possible according to the invention. It will be further appreciated that alternate or additional components may be incorporated into a test case, and that the illustrated flow should not be construed as limiting the scope of the testing process to merely the elements described, as a key feature of the invention is scalability and as such it can be readily adapted to a wide variety of contact center architectures, implemented as additional steps inserted into a testing process as illustrated. Furthermore, in a preferred embodiment the virtual agents and virtual customers are instantiated as "headless browsers" that display nothing, but simply drive the chat testing process in a scriptable way while using the actual infrastructure that would be used in production chat contact centers (i.e., the actual Internet, with agents and virtual customers located remotely from each other, and with chat interactions being handled by interaction servers and other components as if they were "real" chat sessions with "real" customers). This is important, since unlike when testing phone calls, chat sessions must be initiated in testing as they are in production, by sending an appropriate uniform resource locator (URL) from a browser client (in this case, a headless browser) across the Internet to an appropriate server (indicated by the text in the URL), which must then parse the text in the request and decide how to process the incoming chat. The headless browser virtual customer 405 must be able to, under direction of a test script managed by test case manager 401 and executed by chat cruncher 403, initiate a new chat session by sending an appropriate URL across the Internet to router 407 or interaction server 408 (various arrangements are possible), in such a fashion that router 407 recognizes the request as a valid incoming chat interaction and can therefore optionally use chat classifier 409 to classify the incoming chat and decide which (virtual) agent it should be sent to. Similarly, virtual agents 411 may be implemented as headless browsers, for achieving the same testing advantages. In particular, use of headless browsers as virtual customers 405 and virtual agents 411 makes it possible to combine many virtual chat participants in a single computing machine or virtual machine image, since no user interface needs to be provided (and the accompanying user interface overhead is also avoided). Thus, many virtual agents and virtual customers can be instantiated in a small number of machines, and large-scale end-to-end chat testing can be accomplished in which all of the potential points of failure are testable. In this manner, a particular testing system may interact with a variety of frontends in a meaningful manner, and new or alternate frontends may be implemented without requiring changes to a testing system itself. In some embodiments, headless browsers acting as virtual agents 411 or virtual customers 405 may be configured to store each chat interaction as it occurs, so that test administrators may view what actually happened at the location of the virtual agent 411 or virtual customer 405; in some cases, such data may be provided to a test administrator in the form of a user interface that shows precisely what an actual customer (or agent) would have seen had they been participating in the test in question (rather than a virtual customer 405 or a virtual agent 411 using a headless browser). End-to-end testing conducted as described above may be configured (using TCM 401) to ensure that various test cases are passed through each of a plurality of distinct networks (for example, carriers) that may be used to carry actual customer chat interactions, thus ensuring that network-dependent issues can be identified using automated testing. This may be done for example by specifying how a headless browser chat client in a cloud service gets to the enterprise chat servers in each test case, either by explicitly specifying the address of each chat server (which could be connected in various ways and could be located at various physical sites), or by using different cloud servers that are each connected to a different network provider so that each can be exercised (or by using both methods).

Figure 6:
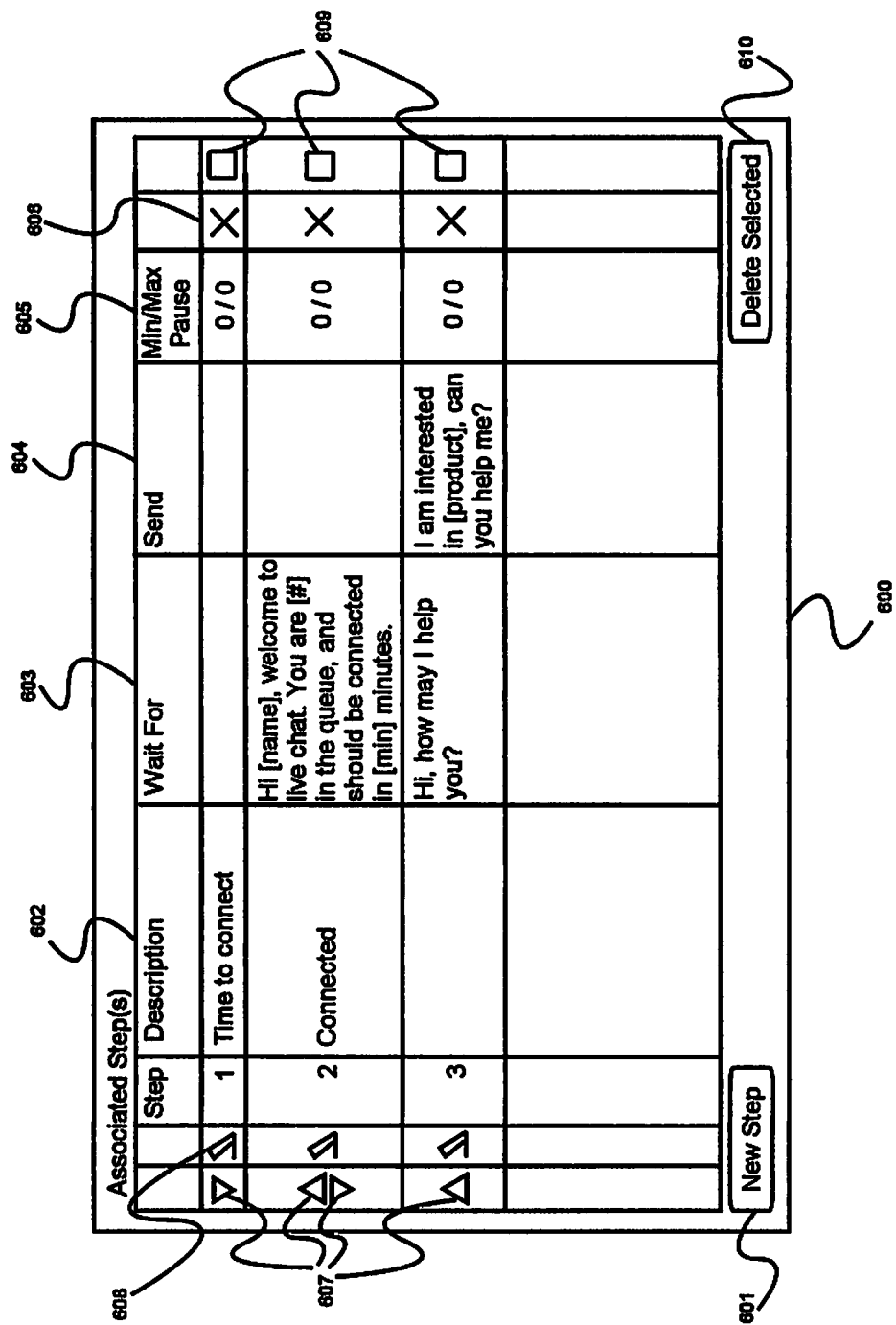
FIG. 6 is an illustration of a test case creation interface, according to a preferred embodiment of the invention.

FIG. 6 is an illustration of an exemplary graphical user interface 600 for user creation and modification of a test case within a TCM platform, according to a preferred embodiment of the invention. As illustrated, an interface 600 may comprise several components such as an interactive button or similar element for creation of a new test step 601, a plurality of text fields describing elements of existing test steps such as a step description 602, text strings to wait for 603, text to send 604, criteria for pause length between steps 605, clickable or otherwise interactive elements for deleting steps 606 or selecting steps to perform batch operations 609, clickable or otherwise interactive elements for reordering steps 607, clickable or otherwise interactive elements for editing existing steps 608, or clickable or otherwise interactive elements for manipulating selected steps 610 such as (as illustrated) deleting multiple steps in a single operation.

When a step is created, a user may supply a variety of information to identify and control behavior of the test step. For example, as illustrated, a description field 602 may be implemented to identify steps for ease of interpreting previously-created test cases. Behavior-controlling fields as illustrated may include text strings that a test agent or customer must wait to receive before proceeding 603, or similar text strings that should be sent when a step is initiated 604. In this manner, each step may simulate a "send-receive" pattern to simulate customer-agent interaction, or a step might include only one of the two fields so as to simulate asymmetrical interaction wherein one party might send multiple chat messages before receiving a response. As further illustrated, numerical behavior-controlling elements may be implemented such as to specify wait times between steps 605, controlling the pace of a test case. This might be implemented to facilitate "stress-testing" of a contact center under heavy traffic, or to pace tests to distribute the system load so as to avoid load-based failure while testing other features or systems (i.e., when stress-testing is not a goal of the test case).

Figure 7:
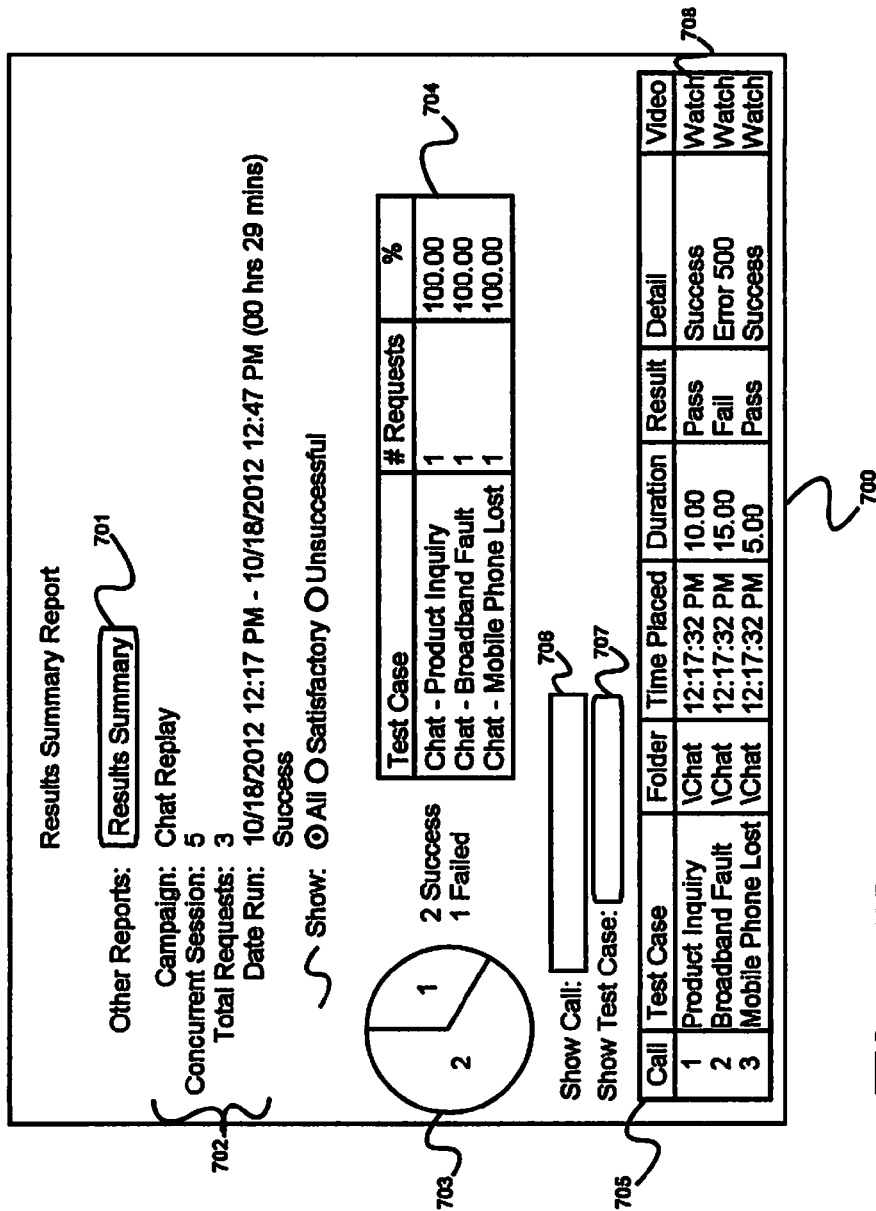
FIG. 7 is an illustration of a test results summary interface, according to a preferred embodiment of the invention.

FIG. 7 is an illustration of an exemplary graphical user interface 700 for viewing of a testing results report, according to a preferred embodiment of the invention. As illustrated, an interface 700 may comprise a variety of elements intended to convey information contained in stored logs from previously-run or currently-running test cases as described previously, such elements optionally including clickable or otherwise interactive buttons 701 and 707, text display fields 702, text input fields 706, graphical or text-based tables or charts 703, 704, and 705, or any of a variety of other user interface elements as are commonly found in the art. Such elements as illustrated are exemplary, and it will be appreciated that a variety of arrangements utilizing alternate, additional, or fewer elements may be possible according to the invention, however the illustrated arrangement is preferred by the inventor as an effective method of displaying desirable content to a user.

As illustrated, a clickable or otherwise user interactive element such as a button or drop-down list-style menu 701 may display and allow a user to select a results report for viewing, selecting from a variety of reports available in a storage medium such as database 402. A user may select a report from such an element, which may then dynamically update displayed content of interface 700 to reflect the relevant data from the selected report. Text display fields 702 may be implemented to present non-interactive data to a user, i.e. recorded information about a previous test case that a user should not have a need or ability to manipulate, as may be desirable to prevent inconsistent or unreliable data due to human tampering or error. Such presented information may include (but is not limited to) a test case or test campaign name, numerical counts of the quantity of chat sessions or requests performed during a test case, and timestamp data such as dates and times that tests were run or chats were initiated. It will be appreciated that such information may be highly variable according to the specific nature of a test case and according to a particular implementation of the invention within a contact center, and that such information as illustrated is exemplary and alternate, substitute, or additional information may be displayed according to the invention.

An interface 700 may also comprise (as illustrated) a number of graphical or text-based tables or charts 703, 704, and 705 for presentation of formulated or otherwise organized data to a user. A graphical chart 703 such as a circular graph representing relative percentages of passed or failed tests, or other statistics which might be suitable for graphical presentation such as durations or quantities involved. Such a graph might be clickable or otherwise user-interactive, such interactivity optionally allowing a user to tailor the information being represented within a graph and optionally dynamically updating the display when a selection is made. In this manner, a user may view multiple statistics for a given report concisely, without the need to clutter interface 700 with a large number of graphs, and a user may be able to view only that data which is of interest without having to navigate through irrelevant or undesirable information, thereby reducing the time and frustration for a user as well as increasing reliability of analysis by reducing the risk of misinterpreted data. A text-based table or chart 704 may be implemented to present such data as detailed information on individual interactions within a test case, such as (as illustrated) the names or types of chat interactions initiated as part of a test, quantities of interactions or other numerical measurements, and proportions of success and failure among displayed interactions. It will be appreciated that such information as illustrated is exemplary, and additional or alternate information might be presented according to a specific report or implementation within a contact center, in accordance with the invention.

A text-based table or chart 705 may be displayed presenting detailed information logged form interactions within a test case. Such information might include (but is not limited to) interaction number and name, location in which an interaction's logged information is stored, time or duration of an interaction, result of an interaction's execution with optionally variable detail level (such as a simple pass/fail or a detailed error report), or clickable or otherwise user-interactive elements such as hyperlinks or buttons, as might be used (as illustrated) to display a visual log of an interaction when clicked. It will be appreciated that such information is exemplary, and may vary widely according to a specific report or implementation within a contact center, and furthermore that such information might be customizable by a user so as to only view data of interest as described previously, by selecting what data to display in any particular field, row, or column of a chart or table. Accordingly, clickable or otherwise user-interactive elements may be utilized to control the displayed data in a chart or table, such as a text entry field 706 where a user might enter a specific interaction name or number to view in more detail, or a clickable drop-down list-style field 707 which might enable a user to pick from a selection of data optionally sorted or presented in an orderly fashion for efficient navigation. It will be appreciated that such elements are exemplary and that the nature and function of all illustrated elements may vary according to the invention, and that new methods and arrangements of user interface elements may become available within the art and be utilized according to the invention.

Figure 8:
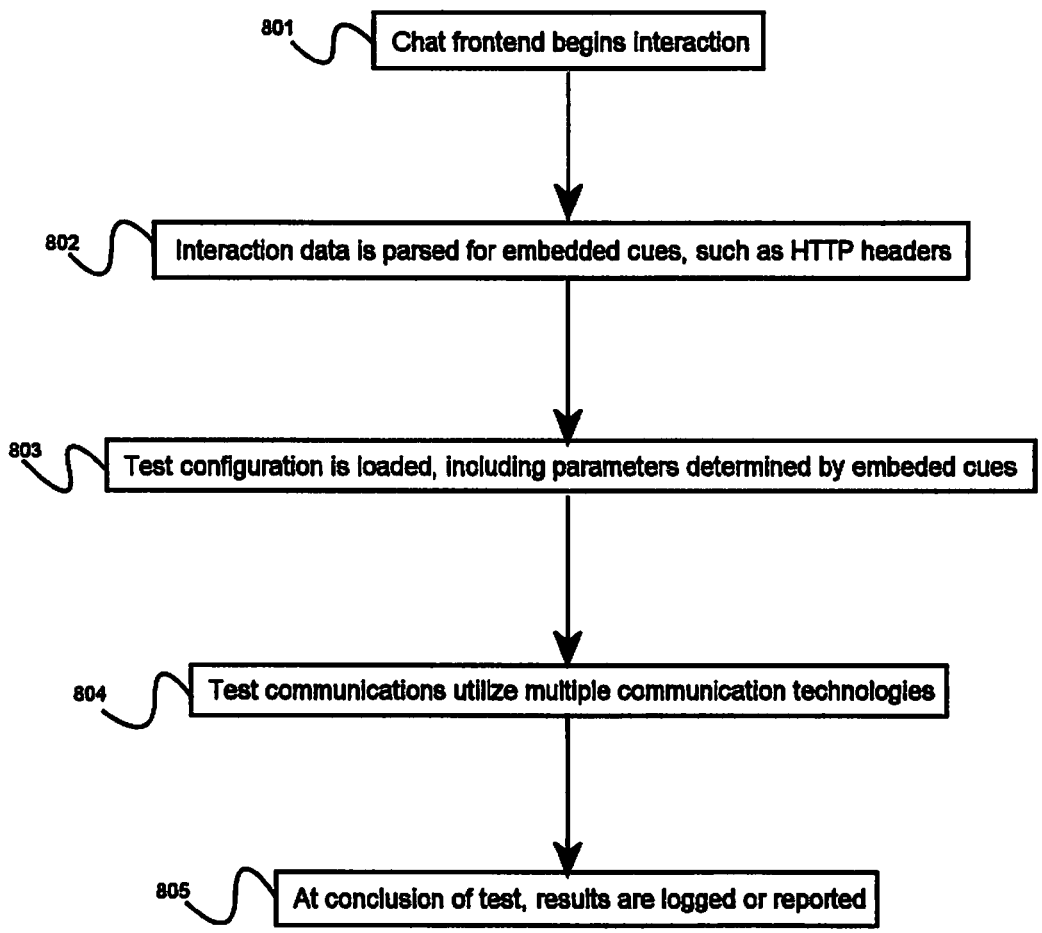
FIG. 8 is a block diagram illustrating an exemplary method for scalable end-to-end chat testing, according to an embodiment of the invention.

FIG. 8 is a block diagram illustrating an exemplary method 800 for operation of a scalable end-to-end chat testing, according to an embodiment of the invention. According to the embodiment, testing may utilize existing elements of Internet communication standards, such as HTTP headers, to operate basic function such as routing or configuration without relying on a particular chat frontend, which may be a "headless browser" that displays nothing but simply drives the chat testing process in a scriptable way while using the actual infrastructure that would be used in production chat contact centers (i.e., the actual Internet, with agents and virtual customers located remotely from each other, and with chat interactions being handled by interaction servers and other components as if they were "real" chat sessions with "real" customers). This is important, since unlike when testing phone calls, chat sessions must be initiated in testing as they are in production, by sending an appropriate uniform resource locator (URL) from a browser client (in this case, a headless browser) across the Internet to an appropriate server (indicated by the text in the URL), which must then parse the text in the request and decide how to process the incoming chat. The headless browser virtual customer 405 must be able to, under direction of a test script managed by test case manager 401 and executed by chat cruncher 403, initiate a new chat session by sending an appropriate URL across the Internet to router 407 or interaction server 408 (various arrangements are possible), in such a fashion that router 407 recognizes the request as a valid incoming chat interaction and can therefore optionally use chat classifier 409 to classify the incoming chat and decide which (virtual) agent it should be sent to. Similarly, virtual agents 411 may be implemented as headless browsers, for achieving the same testing advantages. In particular, use of headless browsers as virtual customers 405 and virtual agents 411 makes it possible to combine many virtual chat participants in a single computing machine or virtual machine image, since no user interface needs to be provided (and the accompanying user interface overhead is also avoided). Thus, many virtual agents and virtual customers can be instantiated in a small number of machines, and large-scale end-to=end chat testing can be accomplished in which all of the potential points of failure are testable. In this manner, a particular testing system may interact with a variety of frontends in a meaningful manner, and new or alternate frontends may be implemented without requiring changes to a testing system itself.

In an initial step 801, a chat frontend (such as a web-based chat application or a dedicated mobile chat application such as on a mobile electronic device) may request interaction. Such a request may be initiated by a user attempting to being a chat (clicking a "chat with an agent" button or similar interactive user interface interaction), or may be a part of an automated process such as in automated testing using simulated chat participants. In this manner a test case need not depend on a particular mechanism for initiation, as such mechanisms may vary according to a frontend being utilized during any particular interaction.

In a next step 802, data sent to a testing system may be processed (such as by a "chat cruncher" or other system elements as described previously) to interpret embedded information such as HTTP headers that may be used in test operation. For example, an interaction may request a particular test server, or request handling in accordance with a particular testing campaign's test criteria (as described below). In this manner, test operation may be ensured regardless of the frontend being utilized, as operation information is inherent to interaction data being communicated, rather than relying on any form of standardization between frontends.

In a next step 803, a test interaction configuration may be loaded (such as a requested configuration as determined in a previous step), to configure test execution. In this manner, a test may self-configure operation to increase efficiency and help avoid user-introduced errors that might decrease reliability of test results (such as an agent selecting an invalid configuration arrangement or making a typographical error that affects function). In addition, loaded configuration may determine such operation as communication technologies to utilize, enabling a test case to operate over a variety of network technologies as needed for comprehensive testing, without needing a frontend to explicitly operate on such technologies (for example, routing a test case from an internet-based chat application through cellular or fiber networks, regardless of the actual physical connection to the computing device operating the frontend). It can be appreciated that by operating in such a manner, a test case may test "real-world" operating conditions that might exist in actual operations between customers and agents, rather than a controlled environment inside a testing facility or contact center that may not account for external factors such as a customer's particular network connection or computer hardware.

In a next step 804, test communications may optionally traverse alternate or additional network technologies, such as to test for a reliable connection to a customer using other connections to chat (such as chatting via a web browser or application on a smartphone or other cellular-enabled mobile device). In this manner a single test case may be used to test multiple connections, expediting the testing process by collecting as much test data as possible per interaction.

In a final step 805, a test may conclude and record or submit results as appropriate (such as storing or sending results according to a loaded configuration in a previous step). It should be appreciated that while test operation as described may involve an agent and a testing system, the functions provided by the invention may be equally applicable and useful to alternate arrangements, such as test interactions between a plurality of automated "chatbots" or similar simulated participants, or between multiple agents. In this manner test operation may encompass a variety of physical or virtual arrangements and comprehensively test for all conditions or interactions that may be experienced during actual contact center operations.

Figure 9:
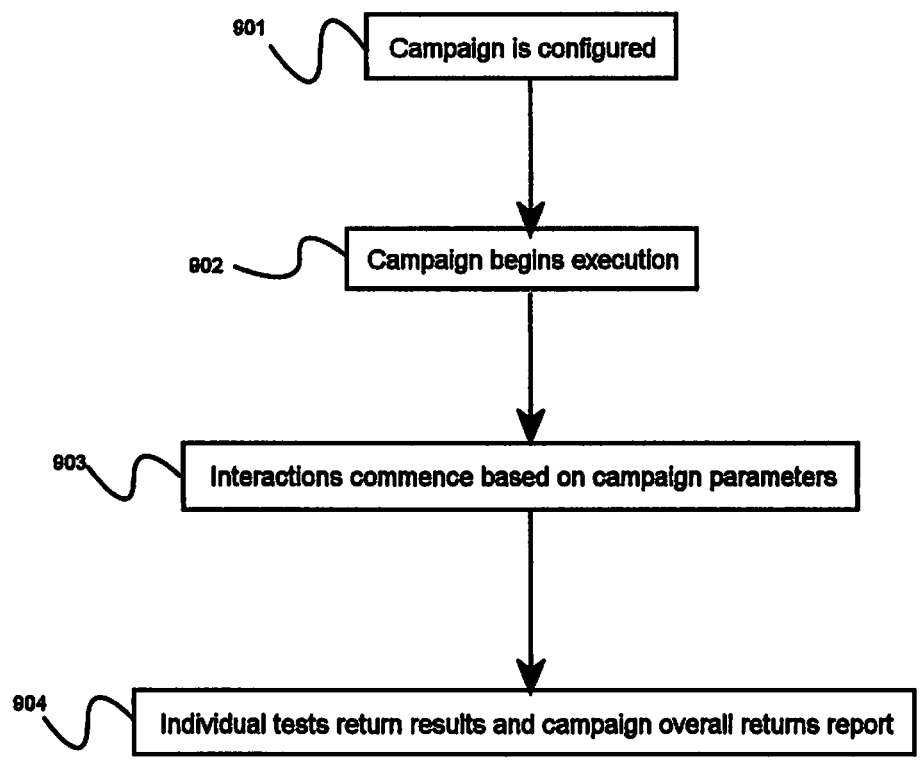
FIG. 9 is a block diagram illustrating an exemplary method for campaign-based testing, according to an embodiment of the invention.

FIG. 9 is a method diagram illustrating an exemplary method 900 for campaign-based test operation. According to such an arrangement, a plurality of test cases may be configured and initiated in accordance with a single "campaign" that may describe a variety of specific tests to be performed, and in this manner multiple tests may be easily configured, performed, and reported. Additionally, given proper configuration a campaign may be seen to function autonomously, such as configuring particular test operation on specific schedules or in response to specified conditions (such as a hardware or software upgrade within a contact center). Furthermore, multiple campaigns may interact with each other such as to perform logic-based adaptive testing, for example utilizing the results of one campaign to configure another or to determine a particular campaign to run next.

Campaigns may be created or managed in a variety of ways, such as from remote or web-based administrative software interfaces or applications (such as may be appropriate for administrators managing campaigns away from the office, for example), or via a test creation interface as described previously (referring to FIG. 6), such that campaigns may be accessible when needed regardless of an administrator's location or available hardware. Furthermore, in this manner existing test systems may easily be adapted to allow for campaign-based functionality by integrating such functionality with existing test creation elements (i.e., centrally-located hardware or software system elements to which other elements such as administrator interfaces may connect), rather than lengthy or costly upgrades to specific administrator devices.

In an initial step 901, a campaign may be configured such as by a contact center administrator or other authorized user. Such configuration may be of varied nature and granularity, as appropriate for desired test operations. In this manner, campaigns may be used to enforce specific test parameters or conditions, or simply perform basic tests at scheduled intervals or in response to specific triggers, or any other such configurable operation as may be desirable.

In a next step 902, a campaign may initiate according to configured parameters (such as being triggered by an event or starting according to a set schedule). Additionally, a campaign may be triggered either internally (from within a contact center, initiating an interaction outbound with an external real or virtual user) or externally (an external user initiating an interaction inbound to a contact center), as may be appropriate for particular campaign operations and according to the nature of tests being performed. For example, an external user might choose to initiate an interaction and trigger a campaign in order to verify function after they make a hardware change to their computer workstation, or a contact center might initiate an outbound interaction as part of a schedule to maintain "health checks" of operations.

In a next step 903, interactions may operate according to campaign configuration, such as one or more interactions operating and potentially operating according to separate, specific parameters. In this manner, a campaign may be used to control a variety of test operation parameters and execute a plurality of tests that may or may not be similar in nature, providing a unified means for configuring operations quickly.

In a final step 904, as tests complete their individual results may be received and stored or reported as appropriate, and upon completion of the campaign in entirety a final "campaign report" may be generated to provide an overview of campaign operation. In this manner, individual tests may be reviewed for specific results, while a campaign's overall operation may be viewed for a quick "overview" such as mat be appropriate for periodic "health check" style testing where a particular feature or system may not be under close scrutiny.

The skilled person will be aware of a range of possible modifications of the various embodiments described above. Accordingly, the present invention is defined by the claims and their equivalents.

What is claimed is:

1. A system for automated end-to-end testing of a text chat-based interaction environment, comprising:
    a test case management platform stored and operating on a network-attached computer;
    a text chat cruncher software module stored and operating on a network-attached computer;
    a text chat classifier software module stored and operating on a network-attached computer;
    an interaction server software module stored and operating on a network-attached computer and configured to simultaneously manage both chat interactions with live customers and chat test cases;
    a contact center manager software module stored and operating on a network-attached computer;
    a plurality of headless browser virtual agent software modules operating on a first network-attached computer; and
    a plurality of headless browser virtual customer software modules operating on a second network-attached computer located remotely from the first network-attached computer and coupled to the first network-attached computer via the Internet;
    wherein the test case management platform comprises a graphical user interface that enables a user to configure operation of the system;
    wherein the text chat cruncher software module operates a plurality of virtual customers by sending instructions to the plurality of headless browser virtual agent software modules over a network;

wherein the contact center manager operates a plurality of virtual agents by sending instructions to the plurality of headless browser virtual customer software modules over a network, enabling them to participate in text chat session with virtual customers;

wherein the interaction server software module, upon receiving a chat-based interaction request, requests a classification of the chat-based interaction request from the text chat classifier software module, and the text chat classifier software module thereupon classifies the chat-based interaction request as corresponding either to a live customer chat interaction or to a text chat test case, whereby both text chat test case interactions and live customer chat interactions are simultaneously handled by the interaction server software module;

wherein the interaction server software module routes, or causes a router to route, live customer chat interactions to real agents and routes, or causes a router to route, text chat test case interactions to simulated agents; and wherein the text chat cruncher handles loading and execution of test cases testing the virtual customer software module for at least customer experience.

2. The system of claim 1, further comprising a desktop automation software stored and operating on a network-attached computer;

wherein the desktop automation software module operates a real or simulated agent desktop for testing of agent experience and software functionality.

\* \* \* \* \*